(12) United States Patent
Liu (10) Patent No.: US 12,503,148 B2
(45) Date of Patent: Dec. 23, 2025

(54) SHOULDER BELT ASSEMBLY AND BABY CARRIER

(71) Applicant: WONDERLAND SWITZERLAND AG, Steinhausen (CH)

(72) Inventor: Wuqing Liu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/654,256

(22) Filed: May 3, 2024

(65) Prior Publication Data

US 2024/0278821 A1    Aug. 22, 2024

Related U.S. Application Data

(63) Continuation of application No. 17/569,864, filed on Jan. 6, 2022, now Pat. No. 12,005,952.

(30) Foreign Application Priority Data

Jan. 7, 2021    (CN) .......................... 202120037845.3

(51) Int. Cl.
| | |
|---|---|
| *B62B 9/24* | (2006.01) |
| *B60N 2/28* | (2006.01) |
| *B60R 22/20* | (2006.01) |

(52) U.S. Cl.
CPC .............. *B62B 9/24* (2013.01); *B60N 2/2812* (2013.01); *B60R 22/20* (2013.01)

(58) Field of Classification Search
CPC .......... A47D 13/08; B60R 22/20; B62B 9/24; B60N 2/2812

USPC .................................................... 297/219.12
See application file for complete search history.

(56) References Cited

U.S. PATENT DOCUMENTS

| | | | |
|---|---|---|---|
| 4,900,087 A | 2/1990 | Crisp | |
| 5,039,169 A | 8/1991 | Bougher et al. | |
| 7,703,806 B2 * | 4/2010 | Bell ...................... | B60R 22/024 |
| | | | 297/483 |
| 7,748,780 B2 * | 7/2010 | Sizemore ............. | B60N 2/2881 |
| | | | 5/655 |
| 8,919,889 B2 | 12/2014 | Kane et al. | |
| 2006/0220427 A1 * | 10/2006 | Patrizi .................. | B60N 2/2812 |
| | | | 297/484 |

(Continued)

FOREIGN PATENT DOCUMENTS

| | | |
|---|---|---|
| CN | 201646633 U | 11/2010 |
| CN | 102665840 A | 9/2012 |

(Continued)

OTHER PUBLICATIONS

Chinese Search Report issued from corresponding Chinese Application No. 202120037845.3, mailed Aug. 2, 2021, pp. 1-13.

(Continued)

*Primary Examiner* — Milton Nelson, Jr.
(74) *Attorney, Agent, or Firm* — HAUPTMAN HAM, LLP (57) ABSTRACT

A shoulder belt assembly for a seat of a baby carrier includes: a fixing belt, both ends of which are fixed to the seat; an adjusting component slidably arranged on the fixing belt; and an adjusting belt connected to the adjusting component in such a way that a length thereof is adjustable. The shoulder belt assembly has advantages of various adjustment modes, simple structure, convenient operation and the like.

16 Claims, 6 Drawing Sheets

(56) References Cited

U.S. PATENT DOCUMENTS

| | | | |
|---|---|---|---|
| 2013/0187421 | A1 | 7/2013 | Foye et al. |
| 2015/0182036 | A1 | 7/2015 | Wigzell et al. |
| 2018/0279804 | A1 | 10/2018 | Romero |

FOREIGN PATENT DOCUMENTS

| | | | |
|---|---|---|---|
| CN | 205239609 U | 5/2016 | |
| CN | 210310528 U | 4/2020 | |
| CN | 211154783 U | 8/2020 | |
| DE | 202006005704 U1 | 6/2006 | |
| DE | 202020104034 U1 | 7/2020 | |
| DE | 202020105059 U1 | 10/2020 | |
| EP | 0035338 A1 | 9/1981 | |
| EP | 3098135 A1 | 11/2016 | |
| GB | 2247606 A | 3/1992 | |
| GB | 2496748 A | 5/2013 | |
| JP | 3230541 U | 2/2021 | |
| WO | 2013016310 A1 | 1/2013 | |

OTHER PUBLICATIONS

Taiwan First Office Action issued from corresponding Taiwan Application No. 111100616, mailed Aug. 2, 2022, pp. 1-7.
Japanese Notice of Reasons for Refusal issued in corresponding Japanese Application No. 2022-001657, mailed Mar. 13, 2023, pp. 1-6.
Notice of Reasons for Refusal issued in Japanese Application No. 2023-179867, mailed Aug. 5, 2024, 8 pgs.

\* cited by examiner

SHOULDER BELT ASSEMBLY AND BABY CARRIER

CROSS-REFERENCE TO RELATED APPLICATIONS

The present application is a continuation application of U.S. patent application Ser. No. 17/569,864, filed on Jan. 6, 2022, which has been issued as U.S. Pat. No. 12,005,952, and claims priority to Chinese Patent Application No. 202120037845.3, filed on Jan. 7, 2021. The entire contents of the above-listed applications are incorporated herein by reference.

TECHNICAL FIELD

The present disclosure relates to a shoulder belt assembly, and in particular to a shoulder belt assembly for a baby carrier. The present disclosure also relates to a baby carrier.

BACKGROUND

A baby carrier is a vehicle for carrying a baby or infant. The baby carrier usually has wheels and a seat. The wheels enable the baby carrier to be conveniently pushed to move. The seat is usually provided with a safety belt to restrain the baby when the baby carrier is moved, so as to ensure his/her safety. The safety belt may include a shoulder belt, a waist belt, an abdominal belt, or the like, so as to restrain different parts of the baby's body.

In the prior art, although the shoulder belt may be adjusted, it is usually only adjustable in length. For a growing baby, when the shoulder of the baby is higher than a fixed point of the shoulder belt, an adjustment of the shoulder belt could not well satisfy the requirements of restraining the shoulder of the baby.

Therefore, it is necessary to provide a shoulder belt assembly that may be adjusted in other ways.

SUMMARY

An objective of the present disclosure is to provide a shoulder belt assembly and a baby carrier, which can alleviate or eliminate at least one of the above-mentioned issues.

In order to achieve the above objective, in one aspect, the present disclosure provides a shoulder belt assembly for a seat of a baby carrier, which includes: a fixing belt with both ends fixed to the seat: an adjusting component slidably arranged on the fixing belt; and an adjusting belt connected to the adjusting component in such a way that a length thereof is adjustable.

In one embodiment, one of both ends of the fixing belt is detachably fixed to the seat.

In one embodiment, the fixing belt is vertically positioned on a backrest of the seat, and an upper end of the fixing belt is detachably fixed to the seat.

In one embodiment, the shoulder belt assembly further includes a bearing portion transversely fixed on the backrest of the seat, and both ends of the fixing belt are fixed to the seat by being fixed to the bearing portion.

In one embodiment, the bearing portion is formed into two woven belts.

In one embodiment, the adjusting belt passes through the adjusting component to form a free end, and the shoulder belt assembly further includes a constraint ring sleeved on the adjusting belt and may restrain the free end.

In one embodiment, a fastener is formed on one end of the fixing belt, and a snap ring is formed on the bearing portion, and the fastener can be detachably fixed to the snap ring.

In one embodiment, both ends of the fixing belt are fixed to the seat by sewing.

In another aspect, the present disclosure provides a baby carrier, which includes: a shoulder belt assembly as described above: a frame: a seat arranged on the frame; and an auxiliary cushion connected to the seat.

In one embodiment, the auxiliary cushion has an upper opening and partially covers the shoulder belt assembly, and the adjusting belt extends out of the auxiliary cushion through the upper opening.

In one embodiment, the baby carrier further includes a waist belt assembly, an abdominal belt assembly and a central locking member, wherein the auxiliary cushion has a lower opening. The waist belt assembly is fixed to a backrest of the seat. The abdominal belt assembly is fixed to a seat cushion of the seat. The central locking member is connected to a free end of the abdominal belt assembly. The waist belt assembly passes through the auxiliary cushion via the lower opening so as to be partially covered by the auxiliary cushion. The adjusting belt and the waist belt assembly are detachably fixed to the central locking member.

Compared with the prior art, the present disclosure can adjust the shoulder belt assembly more flexibly, so as to adapt to a baby with growing height. Furthermore, the shoulder belt assembly of the present disclosure has simple structure and good reliability, and is convenient to operate.

BRIEF DESCRIPTION OF THE DRAWINGS

Various objectives, features and advantages of the present disclosure will become more apparent when considering the following detailed description of the preferred embodiments of the present disclosure in conjunction with the accompanying drawings. The drawings are only exemplary illustrations of the present disclosure and are not necessarily drawn to scale. In the drawings, the same reference numbers always refer to the same or similar parts. In the drawings.

Reference numbers in the drawings are shown as follows:

10 - safety belt assembly
100 - shoulder belt assembly
110 - fixing belt
120 - adjusting belt
121 - free end
130 - adjusting component
140 - snap ring 150 - fastener
160 - bearing portion
170 - restraint ring 170
300 - waist belt assembly
400 - abdominal belt assembly
500 - central locking member
20 - auxiliary cushion
210 - upper opening
220 - lower opening
230 - engaging sheet
231 - engaging part
30 - frame
40 - seat

DETAILED DESCRIPTION

In order to further explain the principle and structure of the present disclosure, the preferred embodiments of the present disclosure will now be described in detail with reference to the accompanying drawings. However, these embodiments are only for illustration and explanation, and cannot be used to limit the protection scope of the present disclosure.

The terminology used in the present disclosure is only for the purpose of describing specific embodiments and is not intended to limit the present disclosure. The singular forms "a/an", "said" and "the" used in the present disclosure and the appended claims are also intended to include multiple forms, unless clearly indicated as other meanings. It should also be understood that the word "and/or" as used herein refers to and includes any or all possible combinations of one or more associated listed items.

Figure 1:
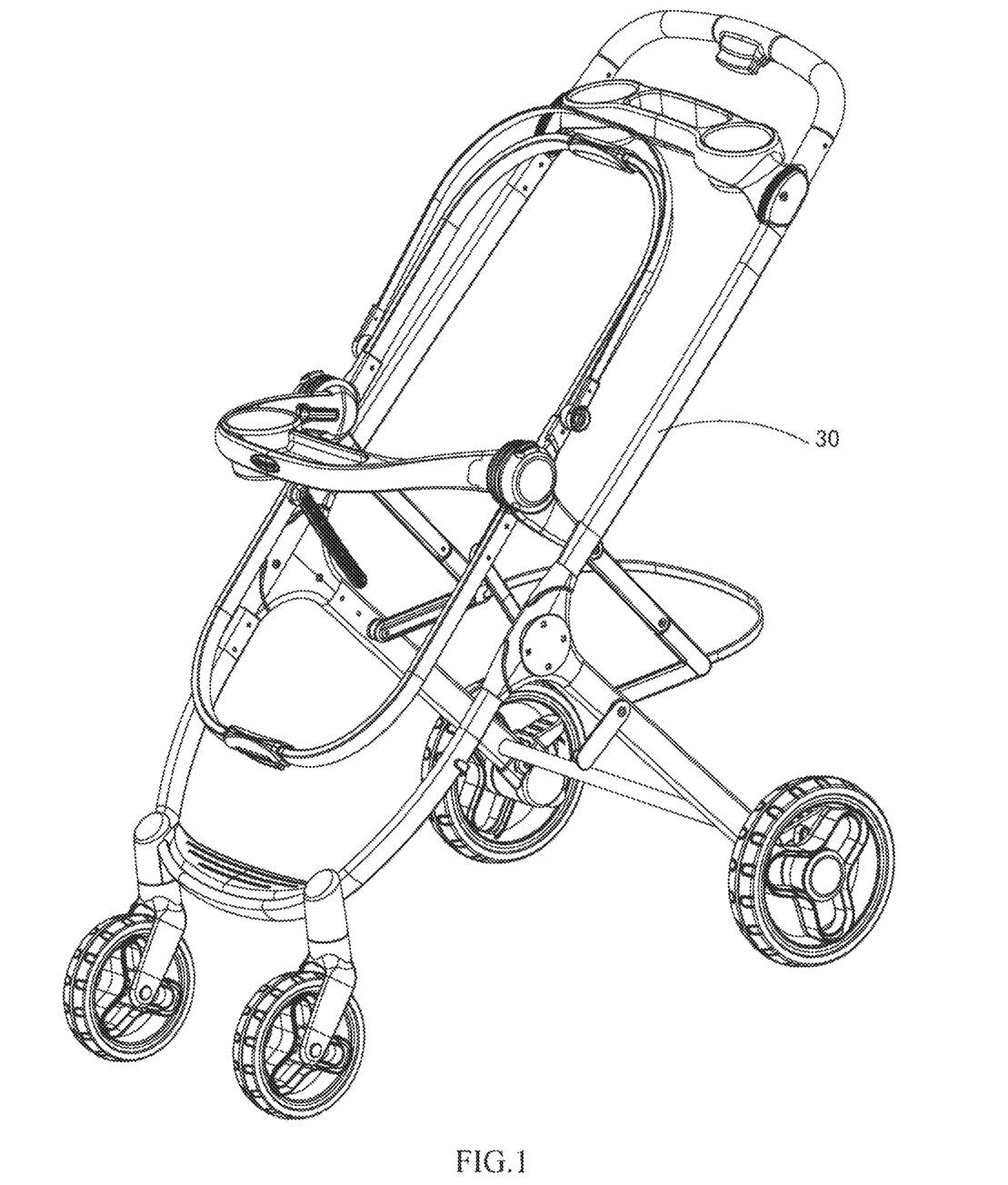
FIG. 1 is a perspective view of a frame of a baby carrier according to the present disclosure.
Figure 2:
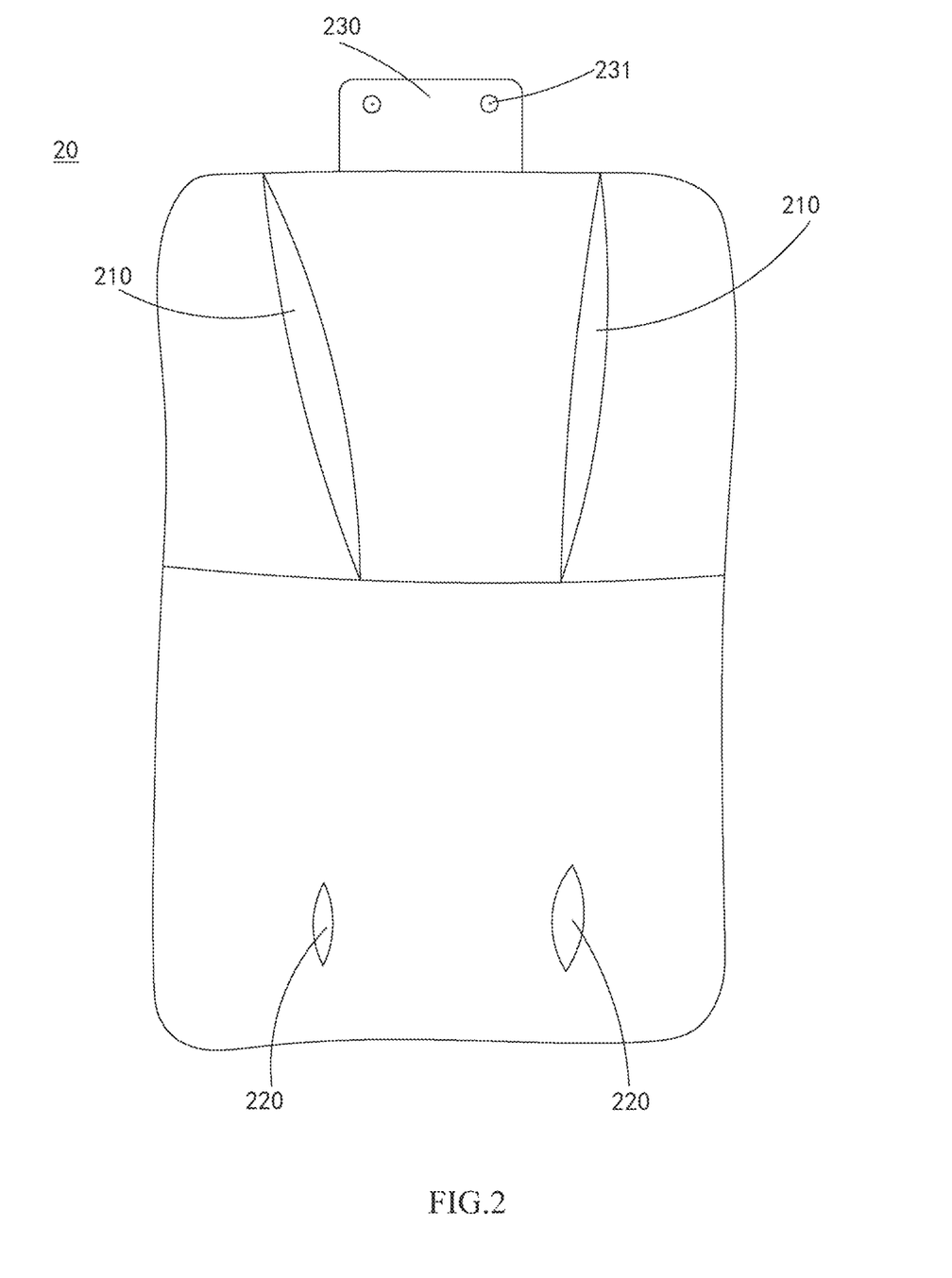
FIG. 2 is a schematic view of a rear portion of an auxiliary cushion of the baby carrier according to the present disclosure.

FIG. 1 is a perspective view of a frame of a baby carrier according to the present disclosure, and FIG. 2 is a schematic view of an auxiliary cushion of the baby carrier according to the present disclosure.

The baby carrier of the present disclosure may have a frame 30 as shown in FIG. 1. Optionally, the baby carrier of the present disclosure has other styles of frames. The frame 30 may have a seat 40 thereon (see FIG. 3). The seat 40 is a component for carrying a baby or an infant, and may include a seat cushion for receiving legs and buttocks of the baby and a backrest for supporting the back and head of the baby.

Figure 3:
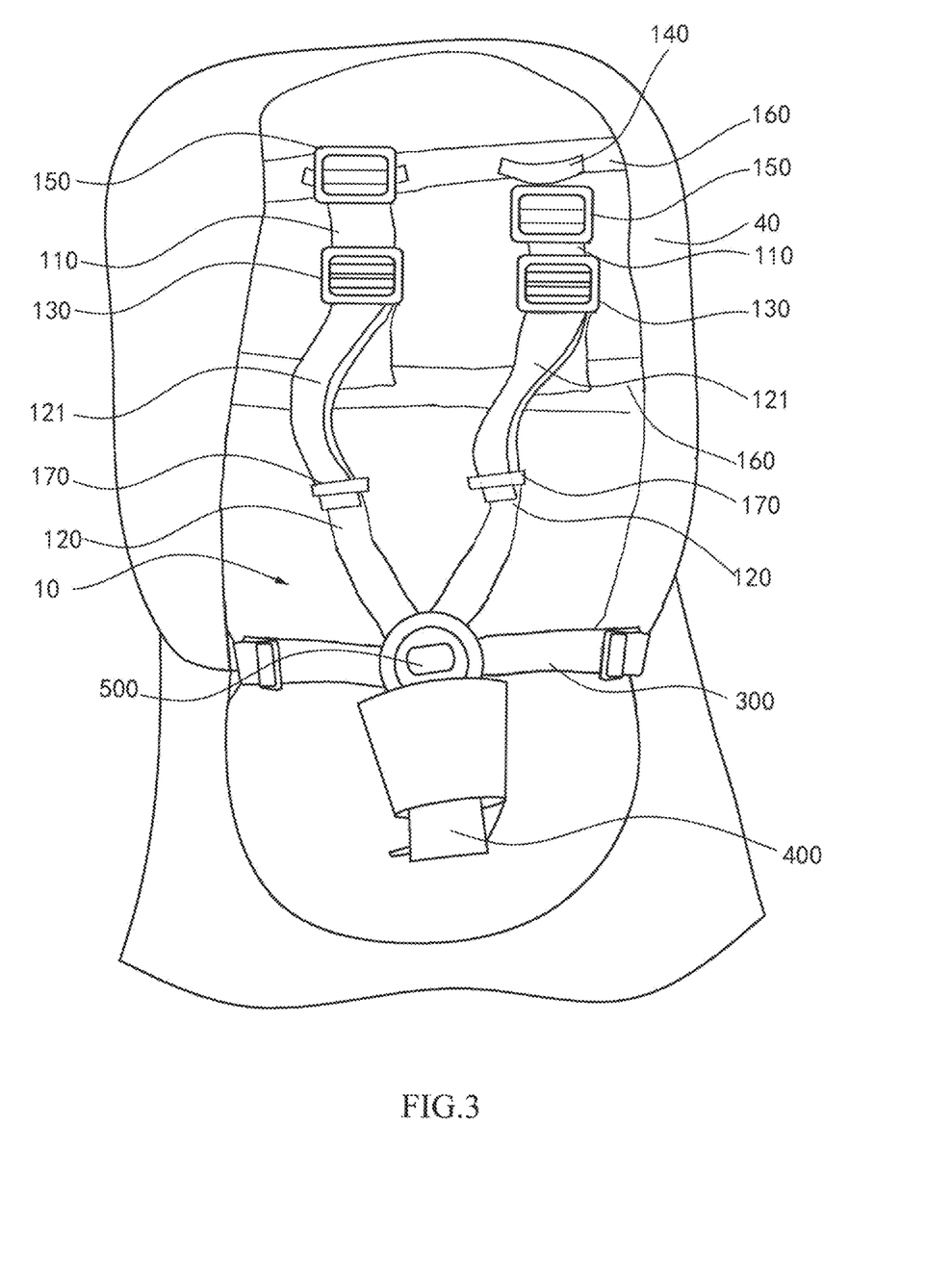
FIG. 3 is a partial schematic view of the baby carrier according to a first embodiment of the present disclosure.
Figure 4:
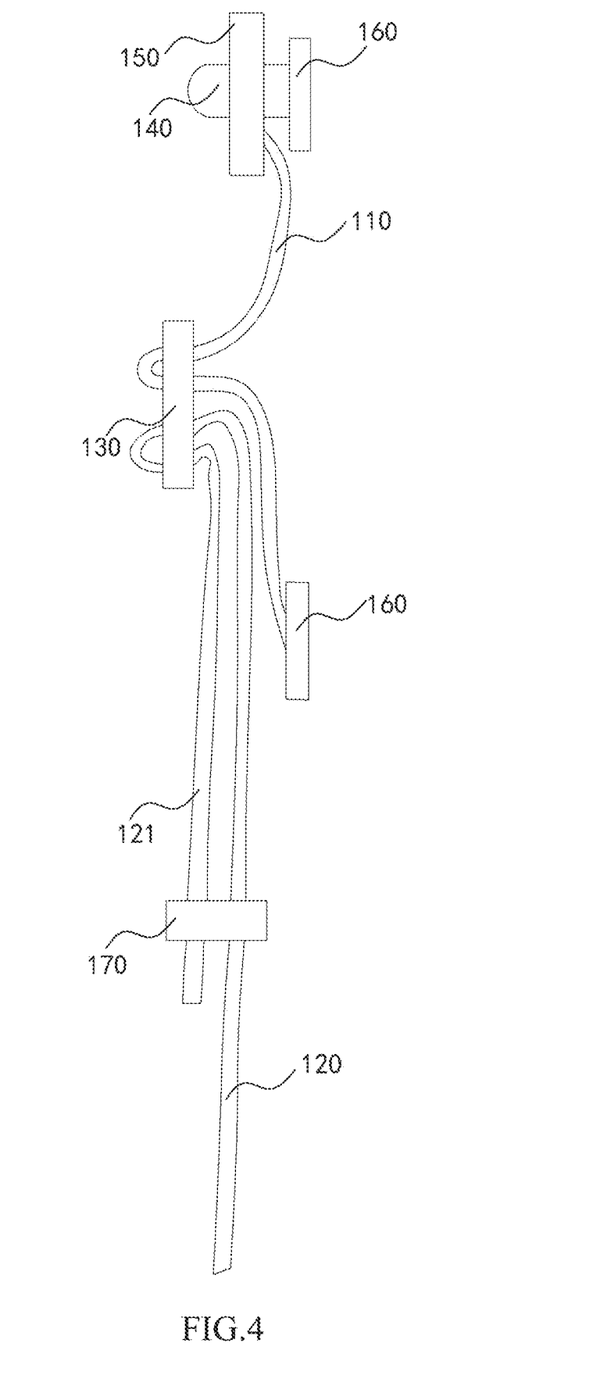
FIG. 4 is a schematic side view of a shoulder belt assembly according to the first embodiment of the present disclosure.

FIG. 3 is a partial schematic view of the baby carrier according to a first embodiment of the present disclosure, and FIG. 4 is a schematic side view of a shoulder belt assembly according to the first embodiment of the present disclosure. FIG. 4 shows various components only in a modular manner, without illustrating a specific winding manner of the fixing belt and the adjusting belt.

The first embodiment of the present disclosure will be described below.

The seat 40 may be provided with a safety belt assembly 10 for restraining the baby, so as to prevent the baby from accidentally falling off the baby carrier when the baby carrier is moving.

The safety belt assembly 10 includes a shoulder belt assembly 100, a waist belt assembly 300, an abdominal belt assembly 400 and a central locking member 500. The shoulder belt assembly 100 and the waist belt assembly 300 may be fixed to the backrest of the seat 40, and the abdominal belt assembly 400 may be fixed to the seat cushion of the seat 40. An end (i.e., free end) of the abdominal belt assembly 400 away from the seat cushion may be fixed with the central locking member 500. The shoulder belt assembly 100 and the waist belt assembly 300 are detachably fixed to the central locking member 500, so that the safety belt assembly 10 is in a use state.

As shown in FIGS. 3 and 4, the shoulder belt assembly 100 and the waist belt assembly 300 may be symmetrically arranged at both sides of the seat 40. In the following description, only the shoulder belt assembly 100 and the waist belt assembly 300 on one side will be described. It can be understood that the description of the shoulder belt assembly 100 and the waist belt assembly 300 on the one side may also be applied to the shoulder belt assembly 100 and the waist belt assembly 300 on the other side.

As shown in FIG. 2, the auxiliary cushion 20 is a separate cushion which may be arranged on the backrest of the seat 40. The auxiliary cushion 20 may have an upper opening 210 and a lower opening 220. Both the upper opening 210 and the lower opening 220 may be arranged symmetrically in a left-right direction as shown. The auxiliary cushion 20 may cover parts of the shoulder belt assembly 100 and the waist belt assembly 300, so that the back of the baby may lean on a flat surface and improve the use comfort. The shoulder belt assembly 100 may pass through the auxiliary cushion 20 through the upper opening 210. The waist belt assembly 300 may pass through the auxiliary cushion 20 via the lower opening 220.

The back of the auxiliary cushion 20 may be provided with an engaging sheet 230. An upper side of the engaging sheet 230 may be fixed to an upper side of the auxiliary cushion 20. FIG. 2 shows a state in which the engaging sheet 230 is upturned. An engaging part 231 may be provided on the engaging sheet 230 to be combined with a body of the baby carrier. Each of two sides of the engaging sheet 230 may be provided with one engaging part 231. Optionally, the engaging sheet 230 may have other numbers of engaging parts 231, for example, one engaging part, three engaging parts, or the like. The engaging part 231 may be, for example, a snap-fastener, a buckle, a hook and loop fastener, etc.

The shoulder belt assembly 100 may include: a fixing belt 110, both ends of which are fixed to the seat 40: an adjusting component 130 slidably provided on the fixing belt 110: an adjusting belt 120 connected to the adjusting component 130 in such a way that a length thereof may be adjusted.

As shown in FIG. 3, one end (e.g., an upper end) of the fixing belt 110 is detachably fixed to the seat 40. The shoulder belt assembly 100 may further include a bearing portion 160. The bearing portion 160 may be formed as a transverse woven belt and may be fixed to the backrest of the seat 40. The bearing portion 160 may be formed into two transverse woven belts which are spaced apart from each other by a certain distance. The bearing portion 160 may also be integrally formed. A fastener 150 may be fixed on the upper end of the fixing belt 110, and a snap ring 140 may be formed on the bearing portion 160. The fastener 150 may be detachably fixed to the bearing portion 160 through the snap ring 140, and finally the fixing belt 110 may be detachably fixed to the backrest of the seat 40. After the fastener 150 passes through the snap ring 140, the fastener 150 cannot pass through the snap ring 140 in an opposite direction by pulling the fixing belt 110. When it is necessary to enable the fastener 150 to pass through the snap ring 140, the fastener 150 is required to pass through the snap ring 140 at a specific angle or in a specific route. A lower end of the fixing belt 110 may be directly sewn to the backrest of the seat 40 or the woven belt of the lower portion of the bearing portion 160.

Optionally, the upper end of the fixing belt 110 is non-detachably fixed, while the lower end of the fixing belt 110 is detachably fixed to the seat 40 or the bearing portion 160. Optionally, both ends of the fixing belt 110 are detachably fixed to the seat 40 or the bearing portion 160.

Referring to FIG. 3, the vertical direction in the present disclosure is an up-down direction in FIG. 3, while the transverse direction in the present disclosure is the left-right direction in FIG. 3. It should be noted, since the shoulder belt assembly 100 has a plurality of flexible components, the vertical and transverse directions are approximate directions, but not precise directions.

The fixing belt 110 is slidably provided with an adjusting component 130. The adjusting component 130 may be formed as a frame having a crossbar in the middle. The fixing belt 110 may pass through the adjusting component 130 from one side of a crossbar, bypass the crossbar, and reversely pass through the adjusting component 130 again from the other side of the crossbar. The adjusting component 130 may also be slidably fixed to the fixing belt 110 in other ways.

The adjusting belt 120 may pass through the adjusting component 130 and reversely extend to form a free end 121. The adjusting belt 120 may pass through the adjusting component 130 from one side of the other crossbar of the adjusting component 130, bypass the other crossbar, and reversely pass through the adjusting component 130 again from the other side of the other crossbar. An end of the adjusting belt 120 away from the free end 121 may be formed with a component that cooperates with the central locking member 500 to be locked. The shoulder belt assembly 100 may further include a restraint ring 170, and the restraint ring 170 is sleeved on the adjusting belt 120 and may restrain the free end 121. The restraint ring 170 may be slid on the adjusting belt 120. Depending on the length of the free end 121, the restraint ring 170 may move to a position close to a tail of the free end 121 and bind the free end 121 onto the adjusting belt 120. In this way, the adjusting belt 120 may have a neater posture without being scattered. The adjusting belt 120 may also be slidably fixed to the fixing belt 110 by other means. The fixing belt 110 may be tensioned between its two ends, that is, a distance between positions where the two ends of the fixing belt 110 are fixed is substantially equal to a length of the fixing belt 110. The fixing belt 110 may also be slightly inclined, for example, formed in an inverted "八" (i.e., a Chinese character of "eight") shape as shown in FIG. 3. Generally, a baby with a higher shoulder may have a relatively larger shoulder width, so that a slightly inclined arrangement may adapt to a baby with a larger size.

The length of the adjusting belt 120 may be shortened by pulling the free end 121 (thereby shortening the overall length of the shoulder belt assembly 100), while the length of the adjusting belt 120 may be increased by pulling the adjusting belt 120.

The length of the shoulder belt assembly 100 may be changed by sliding the adjusting component 130 on the fixing belt 110, and the fixing position of the adjusting belt 120 may also be changed at the same time. Since the fixing belt 110 is covered by the auxiliary cushion 20, when the shoulder belt assembly 100 is used, the shoulder of the baby only contacts with the adjusting belt 120. The fixing position of the adjusting belt 120 may be changed by sliding the adjusting component 130 on the fixing belt 110, so as to adapt to the baby with different shoulder heights, such that the shoulder belt assembly 100 only applies a binding force towards the backrest of the seat 40, rather than a downward pressure onto the baby.

Figure 5:
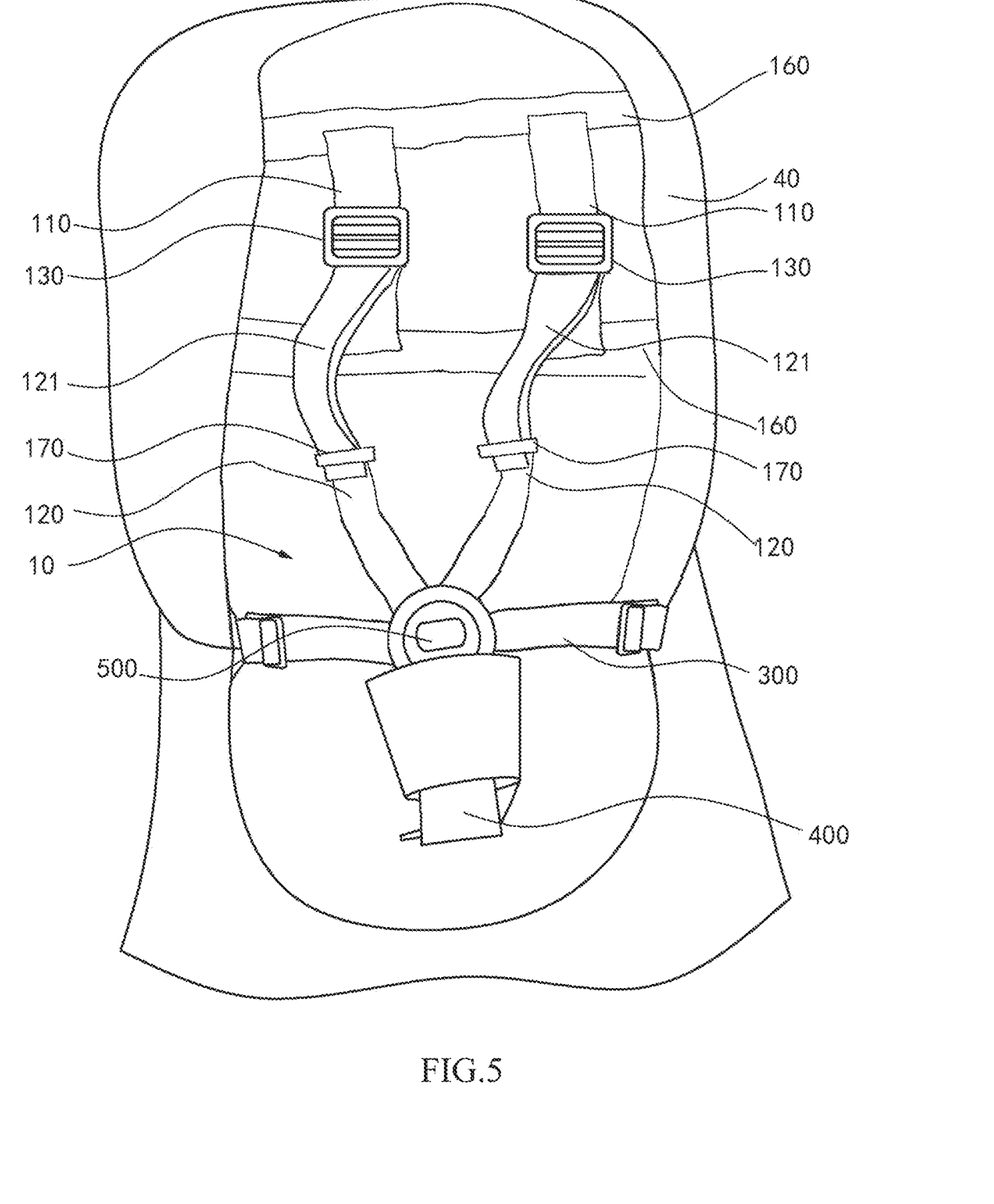
FIG. 5 is a partial schematic view of the baby carrier according to a second embodiment of the present disclosure.
Figure 6:
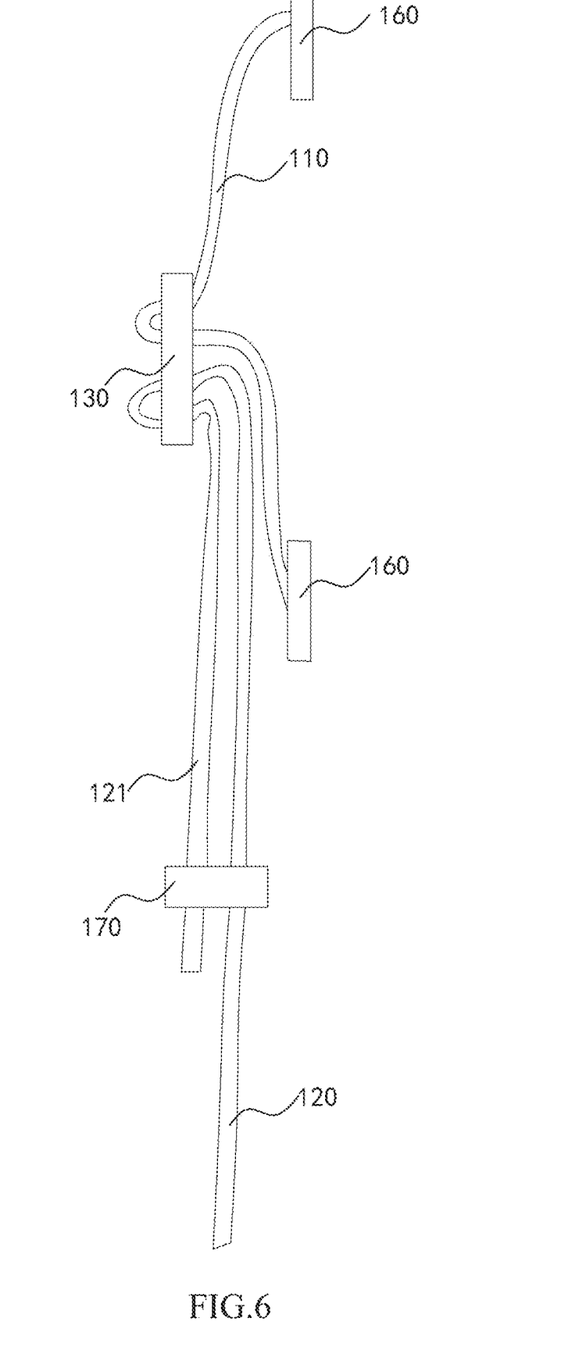
FIG. 6 is a schematic side view of the shoulder belt assembly according to the second embodiment of the present disclosure.

FIG. 5 is a partial schematic view of the baby carrier according to a second embodiment of the present disclosure, and FIG. 6 is a schematic side view of the shoulder belt assembly according to the second embodiment of the present disclosure.

The second embodiment of the present disclosure is similar to the first embodiment, and the difference therebetween will be described below.

Both ends of the fixing belt 110 are non-detachably fixed (for example, by sewing) to the bearing portion 160, however, when there is no bearing portion 160, the ends may also be fixed to the backrest of the seat 40. That is, the fastener 150 is not provided at the end of the fixing belt, and also the snap ring 140 is not formed on the bearing portion 160.

Those skilled in the art will easily conceive of other embodiments of the present disclosure after considering the specification and practicing the present disclosure disclosed herein. The present disclosure is intended to cover any variations, purposes or adaptations of the present disclosure, which conform to the general principles of the present disclosure and include common knowledge or customary technical means in the art that are not disclosed in the present disclosure. The true scope and spirit of the present disclosure is indicated by the claims of the present disclosure.

Although the present disclosure has been described with reference to typical examples, the terminology used is illustrative and exemplary rather than limiting. Since the present disclosure can be implemented in various forms without departing from the spirit and essence of the present disclosure, it should be understood that the above-mentioned embodiments are not limited to any of the foregoing details, but should be interpreted as the broadest possible way within the scope defined by the claims, and therefore all changes that fall within the scope of the claims or their equivalents should be covered by the claims.

What is claimed is:

1. A shoulder belt assembly for a seat of a baby carrier, the shoulder belt assembly comprising:
    a fixing belt having two ends opposite each other in a length direction of the fixing belt, wherein one of the two ends of the fixing belt is configured to be detachably fixed to the seat;
    an adjusting component slidably arranged on the fixing belt;
    an adjusting belt connected to the adjusting component in such a way that a length thereof is adjustable; and
    a pair of bearing portions configured to be fixed on a backrest of the seat, and each of the pair of bearing portions is configured to be transversely fixed on a front side of the backrest of the seat, wherein the pair of bearing portions are formed of two woven belts.

2. The shoulder belt assembly of claim 1, wherein
    the fixing belt is configured to be vertically positioned on a backrest of the seat, and
    an upper end of the two ends of the fixing belt is configured to be detachably fixed to the seat.

3. The shoulder belt assembly of claim 1, wherein
    the adjusting belt passes through the adjusting component to form a free end which is pulled to shorten a length of the adjusting belt, while the adjusting belt is pulled to increase the length of the adjusting belt, and
    the shoulder belt assembly further comprises a restraint ring sleeved on the adjusting belt and configured to restrain the free end.

4. The shoulder belt assembly of claim 1, further comprising a fastener on one end of the fixing belt, and a snap ring on one of the pair of bearing portions,
wherein the fastener is detachably fixed to the snap ring.

5. A baby carrier, comprising:
a frame;
a seat arranged on the frame;
an auxiliary cushion connected to the seat; and
a shoulder belt assembly comprising a fixing belt having two ends opposite each other in a length direction of the fixing belt, an adjusting component slidably arranged on the fixing belt, an adjusting belt connected to the adjusting component in such a way that a length thereof is adjustable, and a pair of bearing portions configured to be fixed on a backrest of the seat;
wherein
one of the two ends of the fixing belt is configured to be detachably fixed to the seat,
each of the pair of bearing portions is configured to be transversely fixed on a front side of the backrest of the seat, and
the pair of bearing portions are formed of two woven belts.

6. The baby carrier of claim 5, wherein
the auxiliary cushion has an upper opening and partially covers the shoulder belt assembly, and
the adjusting belt extends out of the auxiliary cushion through the upper opening.

7. The baby carrier of claim 5, wherein the auxiliary cushion has a lower opening.

8. The baby carrier of claim 5, further comprising a waist belt assembly, an abdominal belt assembly, and a central locking member.

9. The baby carrier of claim 8, wherein
the auxiliary cushion has a lower opening, and
the waist belt assembly passes through the auxiliary cushion via the lower opening so as to be partially covered by the auxiliary cushion.

10. The baby carrier of claim 8, wherein the adjusting belt and the waist belt assembly are detachably fixed to the central locking member.

11. The baby carrier of claim 8, wherein the waist belt assembly is fixed to a backrest of the seat.

12. The baby carrier of claim 8, wherein the abdominal belt assembly is fixed to a seat cushion of the seat.

13. The baby carrier of claim 8, wherein the central locking member is connected to a free end of the abdominal belt assembly.

14. A shoulder belt assembly for a seat of a baby carrier, the shoulder belt assembly comprising:
a fixing belt;
an adjusting component slidably arranged on the fixing belt;
an adjusting belt connected to the adjusting component in such a way that a length thereof is adjustable; and
a bearing portion configured to be transversely fixed on a backrest of the seat,
wherein
the bearing portion is formed into two woven belts, and
one of both ends of the fixing belt is configured to be detachably fixed to the seat.

15. The shoulder belt assembly of claim 14, wherein the both ends of the fixing belt are fixed to the seat by being fixable to the bearing portion.

16. The shoulder belt assembly of claim 14, further comprising a fastener on one of the both ends of the fixing belt, and a snap ring on the bearing portion, the fastener being detachably fixed to the snap ring.

\* \* \* \* \*